(12) United States Patent
Hei et al.

(10) Patent No.: US 12,354,510 B2
(45) Date of Patent: Jul. 8, 2025

(54) FOLDABLE DISPLAY DEVICE AND DRIVING METHOD OF FOLDABLE DISPLAY DEVICE

(71) Applicant: Wuhan Tianma Microelectronics Co., Ltd., Wuhan (CN)

(72) Inventors: Yajun Hei, Wuhan (CN); Guang Wang, Wuhan (CN); Zhihua Yu, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/640,895

(22) Filed: Apr. 19, 2024

(65) Prior Publication Data

US 2024/0265840 A1   Aug. 8, 2024

(30) Foreign Application Priority Data

Apr. 28, 2023   (CN) .......................... 202310487462.X

(51) Int. Cl.
  *G09G 3/00*   (2006.01)
  *G06T 7/73*   (2017.01)
(52) U.S. Cl.
  CPC ............... *G09G 3/035* (2020.08); *G06T 7/73* (2017.01); *G09G 2360/145* (2013.01)
(58) Field of Classification Search
  CPC .... G06T 7/73; G09G 2360/145; G09G 3/035; G06F 1/1652; G06F 1/1616; G06F 1/1681; G06F 3/03; G06F 1/1647; G06F 1/1686; G06F 3/147; G06F 1/1677; H10N 30/302
  See application file for complete search history.

(56) References Cited

U.S. PATENT DOCUMENTS

| | | | | |
|---|---|---|---|---|
| 2003/0160735 A1* | 8/2003 | Lee | .......................... | G06F 3/147 345/4 |
| 2010/0056223 A1* | 3/2010 | Choi | ...................... | G06F 1/1686 455/566 |
| 2010/0067181 A1* | 3/2010 | Bair | ....................... | G06F 1/1616 348/744 |
| 2011/0227822 A1* | 9/2011 | Shai | ....................... | G06F 1/1647 345/156 |
| 2013/0135182 A1* | 5/2013 | Jung | ...................... | G06F 1/1652 345/30 |
| 2014/0247252 A1* | 9/2014 | Lee | .......................... | G09G 3/035 345/204 |

(Continued)

FOREIGN PATENT DOCUMENTS

| | | |
|---|---|---|
| CN | 112463007 A | 3/2021 |
| CN | 114740952 A | 7/2022 |

*Primary Examiner* — Richard J Hong
(74) *Attorney, Agent, or Firm* — KDW FIRM PLLC

(57) ABSTRACT

Provided are a foldable display device and a driving method of a foldable display device. The foldable display device includes a foldable screen, an image sensor, and a driving display unit. The image sensor is located at the edge of the foldable screen and configured to collect an alignment image in an opposed region of the image sensor after the foldable screen is folded. The driving display unit is configured to determine a position of the opposed region of the image sensor according to characteristic information of the alignment image in the opposed region of the image sensor and determine a folded state of the foldable screen according to the position of the opposed region of the image sensor.

20 Claims, 8 Drawing Sheets

(56) References Cited

U.S. PATENT DOCUMENTS

| | | | |
|---|---|---|---|
| 2015/0286288 A1* | 10/2015 | Lee | G06F 3/03 |
| | | | 345/173 |
| 2018/0088633 A1* | 3/2018 | Whitman | G06F 1/1677 |
| 2018/0107250 A1* | 4/2018 | Cho | G06F 1/1652 |
| 2022/0121243 A1* | 4/2022 | Choi | G06F 1/1681 |
| 2022/0139273 A1* | 5/2022 | Shepelev | H10N 30/302 |
| | | | 361/679.02 |
| 2024/0281038 A1* | 8/2024 | Vandermeijden | G06F 1/1677 |

* cited by examiner

FOLDABLE DISPLAY DEVICE AND DRIVING METHOD OF FOLDABLE DISPLAY DEVICE

CROSS-REFERENCE TO RELATED APPLICATION(S)

This application claims priority to Chinese Patent Application No. 202310487462.X filed Apr. 28, 2023, the disclosure of which is incorporated herein by reference in its entirety.

TECHNICAL FIELD

Embodiments of the present invention relate to the field of display technologies and, in particular, to a foldable display device and a driving method of a foldable display device.

BACKGROUND

FIG. 1 is a diagram illustrating the structure of an existing foldable display device. As shown in FIG. 1, in an existing foldable display device, a folded position 101 of a foldable screen 10 is fixed. Therefore, when the screen of the foldable screen 10 is folded, the folded state of the foldable screen 10 is also fixed, and the display region of the foldable screen 10 is also fixed. The screen display of the foldable screen 10 is generally optimized according to the fixed folded position 101 and the fixed display region. In other words, an existing foldable display device has a single folded manner and generally does not need to determine a folded state, or does not have a function of automatically detecting a folded state. Therefore, an existing foldable display device cannot be applied to display technologies of any folded manner or multiple folded manners.

SUMMARY

The present invention provides a foldable display device and a driving method of a foldable display device to determine a folded state of a foldable screen, improve detection accuracy and automation of the folded state of the foldable screen, and improve the use experience of a user.

In a first aspect, an embodiment of the present invention provides a foldable display device. The foldable display device includes a foldable screen, an image sensor, and a driving display unit.

The foldable screen includes a first surface and a second surface which are disposed oppositely along the thickness direction of the foldable screen. The first surface or the second surface is a target display surface. At least one of the first surface and the second surface displays an alignment image. The alignment image has different pieces of characteristic information in at least two different regions.

The image sensor is located at the edge of the foldable screen and configured to collect an alignment image in an opposed region of the image sensor after the foldable screen is folded.

The driving display unit is electrically connected to the image sensor and configured to, according to characteristic information of the alignment image in the opposed region of the image sensor, determine a position of the opposed region of the image sensor, and according to the position of the opposed region of the image sensor, determine a folded state of the foldable screen.

In a second aspect, an embodiment of the present invention also provides a driving method of a foldable display device. The foldable display device includes a foldable screen and an image sensor. The foldable screen includes a first surface and a second surface which are disposed oppositely along the thickness direction of the foldable screen. The first surface or the second surface is a target display surface. At least one of the first surface and the second surface displays an alignment image. The alignment image has different pieces of characteristic information in at least two different regions. The image sensor is located at the edge of the foldable screen.

The driving method includes acquiring an alignment image in an opposed region of the image sensor after the foldable screen is folded; determining the position of the opposed region of the image sensor according to characteristic information of the alignment image in the opposed region of the image sensor; and determining a folded state of the foldable screen according to the position of the opposed region of the image sensor.

Embodiments of the present invention provide a foldable display device and a driving method of a foldable display device. The foldable display device includes a foldable screen, an image sensor, and a driving display unit. The foldable screen includes a first surface and a second surface which are disposed oppositely along the thickness direction of the foldable screen. The first surface or the second surface is a target display surface. At least one of the first surface and the second surface displays an alignment image. The alignment image has different pieces of characteristic information in at least two different regions. The image sensor is located at the edge of the foldable screen and configured to collect an alignment image in an opposed region of the image sensor after the foldable screen is folded. The driving display unit is electrically connected to the image sensor and configured to, according to characteristic information of the alignment image in the opposed region of the image sensor, determine a position of the opposed region of the image sensor, and according to the position of the opposed region of the image sensor, determine a folded state of the foldable screen. According to the embodiments of the invention, the image sensor is adopted to collect the alignment image in the opposed region of the image sensor after the foldable screen is folded. Thus, the detection accuracy and automation of the folded state of the foldable screen can be improved, the situation that an existing foldable display device cannot automatically detect a folded state or cannot automatically adapt to a folded state for display, or a detection mechanism of a folded state is complex is solved, the intelligent degree of the foldable screen is improved, and the use experience of a user is improved. In addition, the driving display unit can determine a position of the opposed region of the image sensor according to characteristic information of the alignment image in the opposed region of the image sensor and determine a folded state of the foldable screen according to the position of the opposed region of the image sensor, thereby performing driving display and optimizing application to adapt to the folded state, which is beneficial to reducing the display power consumption of the foldable screen.

BRIEF DESCRIPTION OF DRAWINGS

To illustrate technical solutions in embodiments of the present invention more clearly, drawings used in description of the embodiments are briefly described below. Apparently, the drawings described below merely illustrate part of the embodiments of the present invention, and those of ordinary

DETAILED DESCRIPTION

Figure 1:
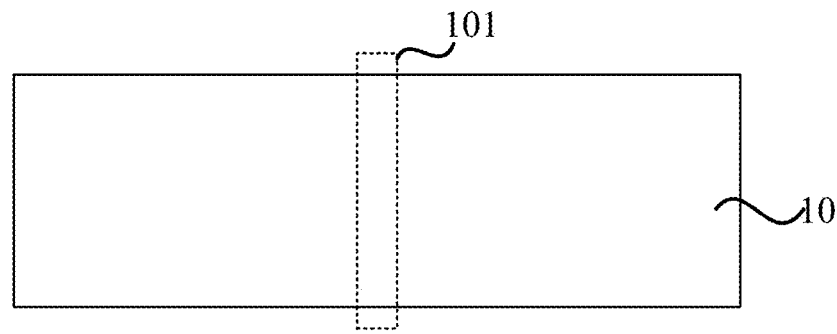
FIG. 1 is a diagram illustrating the structure of an existing foldable display device.

The present invention is further described hereinafter in detail in conjunction with drawings and embodiments. It is to be understood that embodiments described hereinafter are merely intended to explain the present invention and not to limit the present invention. Additionally, it is to be noted that for ease of description, only part, not all, of structures related to the present invention are illustrated in the drawings.

Terms used in embodiments of the present invention are merely used for describing the specific embodiments and not intended to limit the present invention. It is to be noted that nouns of locality, including "on", "below", "left", and "right", used in the embodiments of the present invention, are described from the angles illustrated in the drawings and are not to be construed as a limitation to the embodiments of the present invention. Additionally, in the context, it is to be understood that when an element is formed "on" or "below" another element, the element may be directly formed "on" or "below" another element, or may be indirectly formed "on" or "below" another element via an intermediate element. The terms "first", "second", and the like are merely used for description and used for distinguishing between different components rather than indicating any order, quantity, or importance. For those of ordinary skill in the art, specific meanings of the preceding terms in the present invention may be understood based on specific situations.

As used in the present invention, the term "comprise" and variations thereof are intended to be inclusive, that is, "comprises, but is not limited to". The term "based on" is "at least partially based on". The term "another embodiment" indicates "at least one other embodiment".

It is to be noted that references to "first", "second", and the like in the present invention are merely intended to distinguish corresponding contents and are not intended to limit order or interrelationship.

It is to be noted that "one" and "a plurality" mentioned in the present invention are illustrative and not limiting, and that those skilled in the art should understand that "one" and "a plurality" should be understood as "one or more" unless clearly expressed in the context.

Figure 2:
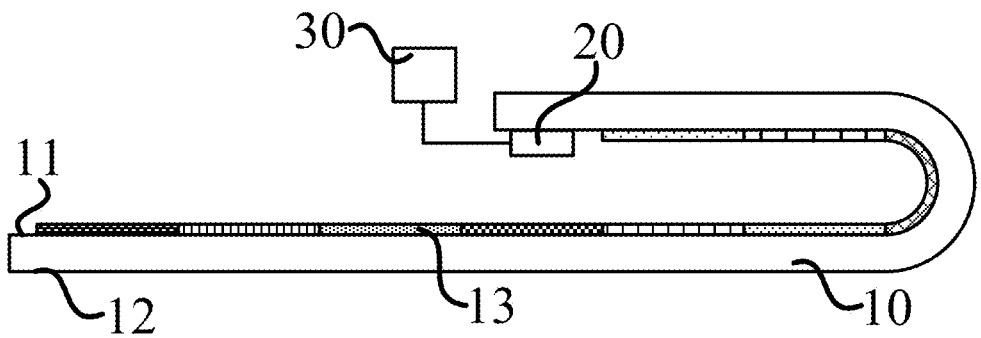
FIG. 2 is a diagram illustrating the structure of a foldable display device according to an embodiment of the present invention.

In view of the preceding problems in the background, an embodiment of the present invention provides a foldable display device. The foldable display device is suitable for a foldable display device, such as a foldable mobile phone or a tablet. FIG. 2 is a diagram illustrating the structure of a foldable display device according to an embodiment of the present invention. As shown in FIG. 2, the foldable display device includes a foldable screen 10, an image sensor 20, and a driving display unit 30. The foldable screen 10 includes a first surface 11 and a second surface 12 which are disposed oppositely along the thickness direction of the foldable screen 10. The first surface 11 or the second surface 12 is a target display surface. At least one of the first surface 11 and the second surface 12 displays an alignment image 13. The alignment image 13 has different pieces of characteristic information in at least two different regions. The image sensor 20 is located at the edge of the foldable screen 10 and configured to collect an alignment image 13 of an opposed region of the image sensor 20 after the foldable screen 10 is folded. The driving display unit 30 is electrically connected to the image sensor 20 and configured to, according to characteristic information of the alignment image 13 in the opposed region of the image sensor 20, determine a position of the opposed region of the image sensor 20, and according to the position of the opposed region of the image sensor 20, determine a folded state of the foldable screen 10.

First, the foldable display device in this embodiment of the present invention is quite different from an existing foldable screen product. The folded position of the existing foldable screen product is fixed or folded in a fixed manner. The foldable display device targeted in this embodiment of the present invention has more folded manners, and the folded position is not fixed. In view of this, the foldable display device in the present invention needs to detect a folded state to exclude a display region that is not required to display and perform driving display in a necessary display region.

Specifically, the foldable display device includes the foldable screen 10, the image sensor 20, and the driving display unit 30. The foldable screen 10 includes the first surface 11 and the second surface 12 which are disposed oppositely along the thickness direction of the foldable screen 10. The first surface 11 or the second surface 12 is the target display surface. The target display surface is a side surface of the foldable screen 10 on which a picture is displayed and a user views a picture. At least one of the first surface 11 and the second surface 12 displays an alignment image 13. The alignment image 13 has different pieces of characteristic information in at least two different regions. When a region on which the alignment image 13 is displayed is folded on the foldable screen 10, a folded position on the foldable screen 10 can be quickly determined according to the difference in the characteristic information of the alignment image 13. Exemplarily, the alignment image 13 may be a preset image that contains different pieces of characteristic information. The image sensor 20 is located at the edge of the foldable screen 10. The position of the image sensor 20 can be changed with the folded action of the foldable screen 10. The size of the image sensor 20 is essentially a difference in resolution. Exemplarily, the image sensor 20 may be an external camera or an under-screen camera. The driving display unit 30 is electrically connected to the image sensor 20. The position of the driving display unit 30 shown in FIG. 2 is merely an example. The driving display unit 30 is integrated on the internal mainboard of the foldable display device. Since the alignment image 13 collected by the image sensor 20 is a region of a certain area, the folded state of the foldable screen 10 is determined according to the characteristic information of the alignment image 13 in the opposed region of the image sensor 20. Exemplarily, the folded state may include information such as a folded position, a folded angle, and a folding line. The folded position is also a region of a certain area.

The embodiments of the present invention provide a foldable display device and a driving method of a foldable display device. The foldable display device includes a foldable screen, an image sensor, and a driving display unit. The foldable screen includes a first surface and a second surface which are disposed oppositely along the thickness direction of the foldable screen. The first surface or the second surface is a target display surface. At least one of the first surface and the second surface displays an alignment image. The alignment image has different pieces of characteristic information in at least two different regions. The image sensor is located at the edge of the foldable screen and configured to collect an alignment image in an opposed region of the image sensor after the foldable screen is folded. The driving display unit is electrically connected to the image sensor and configured to, according to characteristic information of the alignment image in the opposed region of the image sensor, determine a position of the opposed region of the image sensor, and according to the position of the opposed region of the image sensor, determine a folded state of the foldable screen. According to the embodiments of the invention, the image sensor is used to collect the alignment image in the opposed region of the image sensor after the foldable screen is folded. Thus, the detection accuracy and automation of the folded state of the foldable screen can be improved, the situation that an existing foldable display device cannot automatically detect a folded state or cannot automatically adapt to a folded state for display, or a detection mechanism of a folded state is complex is solved, the intelligent degree of the foldable screen is improved, and the use experience of a user is improved. In addition, the driving display unit can determine a position of the opposed region of the image sensor according to characteristic information of the alignment image in the opposed region of the image sensor and determine a folded state of the foldable screen according to the position of the opposed region of the image sensor. Further, in the current folded state, a display region which is blocked due to the folding and a display region which is not blocked can be determined. An image picture is stopped from being displayed in the blocked display region caused by folding, and the image picture is displayed only in the exposed display region. Driving display and optimizing application are performed to adapt to the folded state, which is beneficial to reducing the display power consumption of the foldable screen.

In an embodiment, with continued reference to FIG. 2, the first surface 11 is the target display surface, and the first surface 11 is configured to display the alignment image 13. Alternatively, the first surface 11 is the target display surface, and the second surface 12 is configured to display the alignment image 13.

Specifically, when the first surface 11 is the target display surface and configured to display the alignment image 13, the alignment image 13 can be directly displayed on the first surface 11 in the case of front side folding. Thus, the situation that the display region is blocked or the display effect is affected due to the additional making of the alignment image 13 on the first surface 11 is avoided, the problem that the difficulty in making the alignment image 13 on the foldable screen 10 is relatively high is effectively solved, and steps and preparation cost of making the alignment image 13 on the foldable screen 10 are saved. Moreover, displaying the alignment image 13 on the target display surface can ensure that the alignment image 13 covers the region of the entire target display surface as much as possible. Thus, the image sensor 20 can collect the alignment image 13 in the opposed region of the image sensor 20 after the foldable screen is folded on the target display surface. Alternatively, when the first surface 11 is the target display surface and the second surface 12 is configured to display the alignment image 13, the second surface 12 can display the alignment image 13 in the case of back side folding. An image sensor 20 can be disposed at the edge of the second surface 12. The image sensor 20 may collect the alignment image 13 in the opposed region of the image sensor 20 after the foldable screen is folded on the second surface 12, thereby effectively avoiding a case in which the foldable screen cannot detect the folded state during back side folding.

In an embodiment, with continued reference to FIG. 2, the characteristic information includes display brightness and/or display chroma. The display brightness and/or display chroma of the alignment image 13 are different in at least two different regions.

Specifically, the alignment image 13 is set in advance in the foldable screen 10. The alignment image 13 should have different pieces of characteristic information in at least two different regions. The characteristic information may be display brightness and/or display chroma. That is, the display brightness and/or display chroma of the alignment image 13 are different in at least two different regions. The position of the opposed region of the image sensor 20 after the foldable screen 10 is folded can be judged and determined according to the difference between the display brightness and/or display chroma of different regions. Exemplarily, if the display brightness of the alignment image 13 in the opposed region of the image sensor 20 collected by the image sensor 20 after the foldable screen 10 is folded is the same as the display brightness of a certain region of a preset alignment image 13, the position of the opposed region of the image sensor 20 after the foldable screen 10 is folded can be determined to be located in this region according to the display brightness. Alternatively, if the display chroma of the alignment image 13 in the opposed region of the image sensor 20 collected by the image sensor 20 after the foldable screen 10 is folded is the same as the display chroma of a certain region of a preset alignment image 13, the position of the opposed region of the image sensor 20 after the foldable screen 10 is folded can be determined to be located in this region according to the display chroma.

Figure 3:
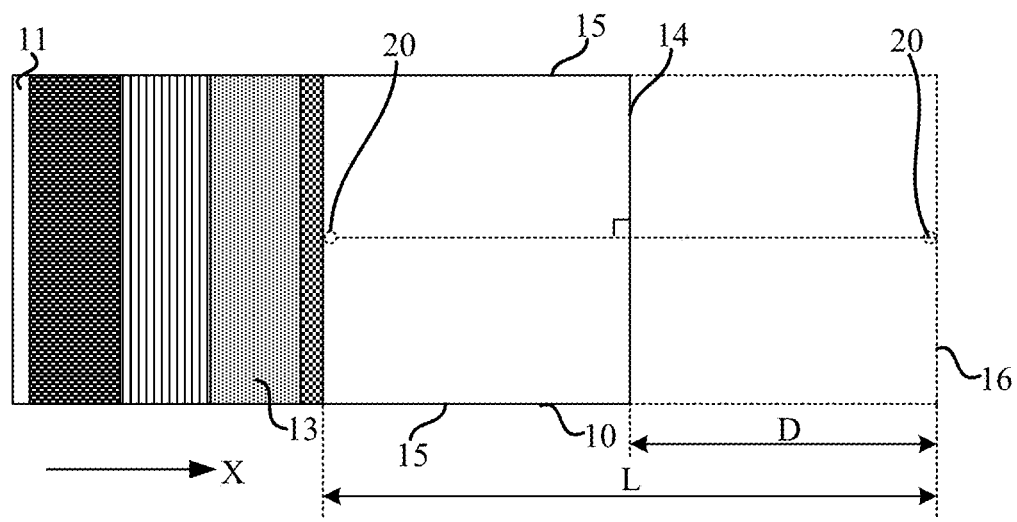
FIG. 3 is a top view illustrating the structure of a foldable display device according to an embodiment of the present invention.

In an embodiment, FIG. 3 is a top view illustrating the structure of a foldable display device according to an embodiment of the present invention. As shown in FIG. 3, a foldable screen 10 includes a folding line 14. The folding line 14 is formed by folding the foldable screen 10. In a first direction X, display chroma and/or display brightness of at least two different regions in an alignment image 13 are different. The first direction X is perpendicular to the extension direction of the folding line 14. Further, the foldable screen 10 includes a bending side 15. The bending side 15 is bent during folding. The bending side 15 is perpendicular to the folding line 14.

Specifically, in the case of positive folding (the folding line 14 is parallel to at least one side of the foldable screen 10), the foldable screen 10 includes the folding line 14 and the bending side 15. The bending side 15 is bent during folding. The folding line 14 is formed after the foldable screen 10 is folded. An image sensor 20 is disposed at the edge of the foldable screen 10. The folding line 14 coincides with the midperpendicular of a line connecting the positions of the image sensor 20 before and after folding. In the first direction X, display chroma and/or display brightness of at least two different regions in the alignment image 13 are different. The first direction X is perpendicular to the extension direction of the folding line 14. The bending side 15 is perpendicular to the folding line 14.

Figure 4:
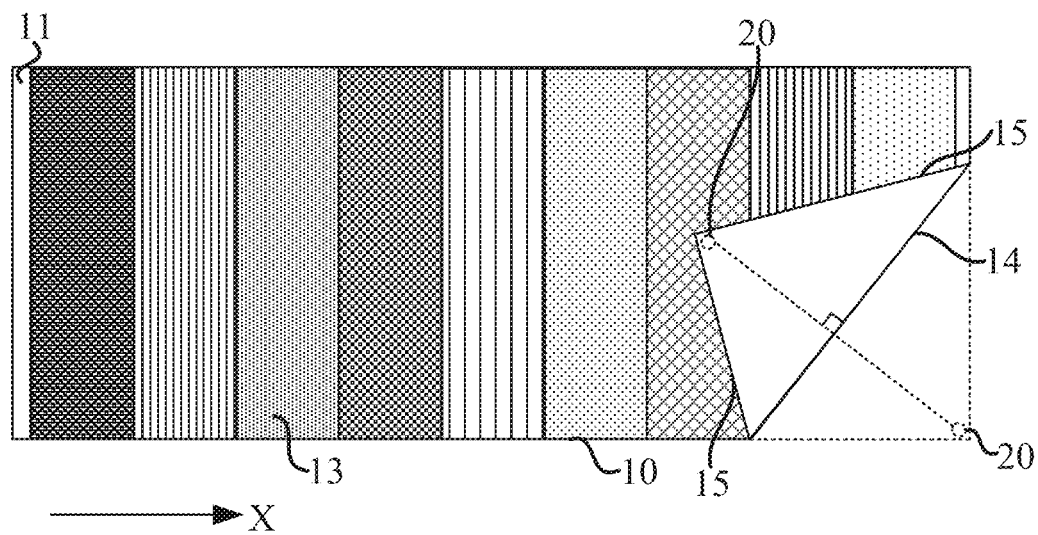
FIG. 4 is a top view illustrating the structure of another foldable display device according to an embodiment of the present invention.

In addition, FIG. 4 is a top view illustrating the structure of another foldable display device according to an embodiment of the present invention. As shown in FIG. 4, in the case of non-positive folding (a folding line 14 is not parallel to any side of a foldable screen 10), multiple image sensors 20 can be disposed at the edge of the foldable screen 10. The folding line 14 still coincides with the midperpendicular of a line connecting the positions of an image sensor 20 before and after folding at the place where folding occurs. In the case where there is a folding angle between a folded portion and an unfolded portion of the foldable screen 10, the chroma and brightness of the opposed region of the image sensor 20 can be compensated by using a driving display unit 30 first. An alignment image 13 at the vertical projection of the image sensor 20 on the plane in which the foldable screen 10 is located can be determined. Then, the folding line 14 can be accurately determined according to the line connecting the positions of the image sensor 20 before and after folding.

Figure 5:
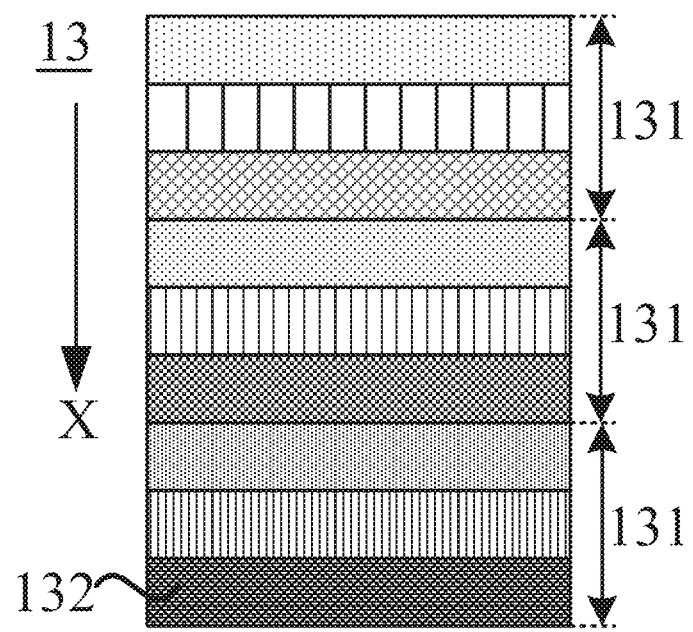
FIG. 5 is a diagram illustrating the structure of an alignment image according to an embodiment of the present invention.

In an embodiment, FIG. 5 is a diagram illustrating the structure of an alignment image according to an embodiment of the present invention. As shown in FIG. 5, an alignment image 13 includes multiple first partitions 131. The multiple first partitions 131 are sequentially arranged along a first direction X. Display brightness of different first partitions 131 is different. A first partition 131 includes multiple first sub-partitions 132. The multiple first sub-partitions 132 are sequentially arranged along the first direction X. Multiple first sub-partitions 132 in the same first partition 131 have same display brightness and different display chroma.

Specifically, in the case of folding along the first direction X, the alignment image 13 may include multiple first partitions 131. The multiple first partitions 131 are sequentially arranged along the first direction X. Display brightness of different first partitions 131 is different. A first partition 131 includes multiple first sub-partitions 132. The multiple first sub-partitions 132 are sequentially arranged along the first direction X. Multiple first sub-partitions 132 in the same first partition 131 have same display brightness and different display chroma. Exemplarily, the alignment image 13 may include three first partitions 131. The three first partitions 131 are sequentially arranged along the first direction X. Display brightness of the three first partitions 131 along the first direction X is gradually increased. Each first partition 131 may include three first sub-partitions 132. The three first sub-partitions 132 are sequentially arranged along the first direction X. Display chroma of the three first sub-partitions 132 along the first direction X is sequentially red, green, and blue. First, according to the display brightness, the opposed region of an image sensor can be determined to be located in one of the three first partitions 131 after a foldable screen is folded. Then, according to the display chroma, the opposed region of the image sensor can be determined to be located in one of first sub-partitions 132 in the one of the three first partitions 131 after the foldable screen is folded. That is, the position of the opposed region of the image sensor can be determined according to the display brightness and/or the display chroma. The problem that the alignment image 13 is difficult to make on the foldable screen is effectively solved.

Figure 6:
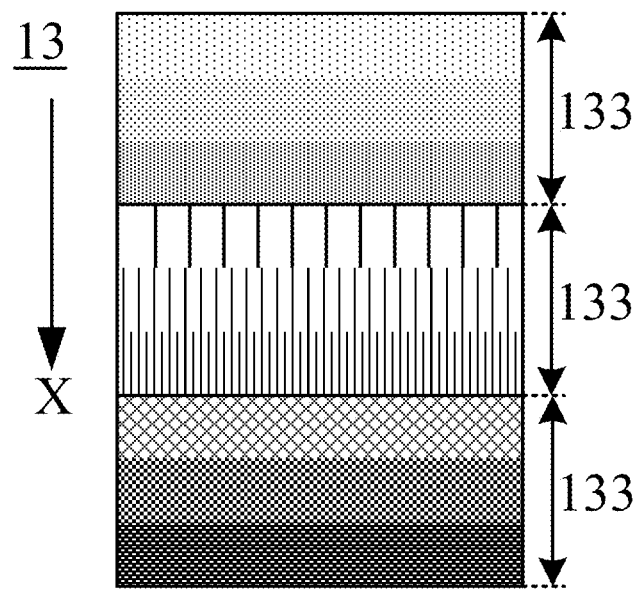
FIG. 6 is a diagram illustrating the structure of another alignment image according to an embodiment of the present invention.

In an embodiment, FIG. 6 is a diagram illustrating the structure of another alignment image according to an embodiment of the present invention. As shown in FIG. 6, an alignment image 13 includes multiple second partitions 133. The multiple second partitions 133 are sequentially arranged along a first direction X. Display chroma of different second partitions 133 is different. Display brightness of different positions in the same second partition 133 in the first direction X is different.

Specifically, in the case of folding along the first direction X, the alignment image 13 may include multiple second partitions 133. The multiple second partitions 133 are sequentially arranged along the first direction X. Display chroma of different second partitions 133 is different. Display brightness of different positions in the same second partition 133 in the first direction X is different. Exemplarily, the alignment image 13 may include three second partitions 133. The three second partitions 133 are sequentially arranged along the first direction X. Display chroma of the three second partitions 133 along the first direction X is sequentially red, green, and blue. Display brightness of different positions in the same second partition 133 in the first direction X is different (exemplarily, display brightness of the same second partition 133 in the first direction X may be gradually increased). First, according to the display chroma, the opposed region of an image sensor can be determined to be located in one of the three second partitions 133 after a foldable screen is folded. Then, according to the display brightness, the opposed region of the image sensor can be determined to be located in a certain position in the one of the three second partitions 133 after the foldable screen is folded. That is, the position of the opposed region of the image sensor can be determined according to the display brightness and/or the display chroma. Moreover, compared with the preceding setting method in which the alignment image 13 includes multiple first partitions and a first partition includes multiple first sub-partitions, the setting method in which the alignment image 13 includes multiple second partitions 133 finally determines the position of the opposed region of the image sensor by using the display brightness. The resolution of the setting method depends on the resolution of the display brightness, which is helpful to improve the detection resolution and accuracy of the folded state of the foldable screen.

Figure 7:
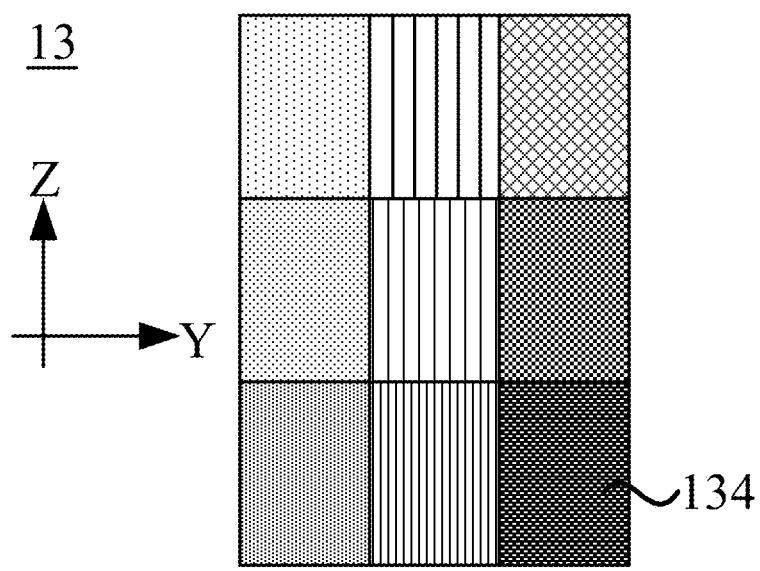
FIG. 7 is a diagram illustrating the structure of another alignment image according to an embodiment of the present invention.

In an embodiment, FIG. 7 is a diagram illustrating the structure of another alignment image according to an embodiment of the present invention. As shown in FIG. 7, display chroma of at least two different regions of an alignment image 13 in a second direction Y is different. Display brightness of at least two different regions of the alignment image in a third direction Z is different. The second direction Y and the third direction Z are two directions arbitrarily intersecting on a plane where a foldable screen is located in a flat state. Further, the alignment image 13 includes multiple third partitions 134 arranged in an array along the second direction Y and the third direction Z. Display chroma and display brightness of the same third partition 134 are the same. Multiple third partitions 134 sequentially arranged in the second direction Y have different display chroma. Multiple third partitions 134 sequentially arranged in the third direction Z have different display brightness.

Specifically, in the case of folding along any direction, the second direction Y and the third direction Z are set to be two directions arbitrarily intersecting on the plane where the foldable screen is located in the flat state. Display chroma of at least two different regions of the alignment image 13 in the second direction Y is different. Display brightness of at least two different regions of the alignment image 13 in the third direction Z is different. The alignment image 13 may include multiple third partitions 134 arranged in an array along the second direction Y and the third direction Z. In the form of blocks, display chroma and display brightness of the same third partition 134 are the same. Multiple third partitions 134 sequentially arranged in the second direction Y have different display chroma. Multiple third partitions 134 sequentially arranged in the third direction Z have different display brightness. Thus, position information of the opposed region of an image sensor after a foldable screen is folded in the second direction Y can be determined according to the display chroma. Position information of the opposed region of the image sensor after the foldable screen is folded in the third direction Z can be determined according to the display brightness. That is, the position of the opposed region of the image sensor can be determined according to the display brightness and/or the display chroma.

Figure 8:
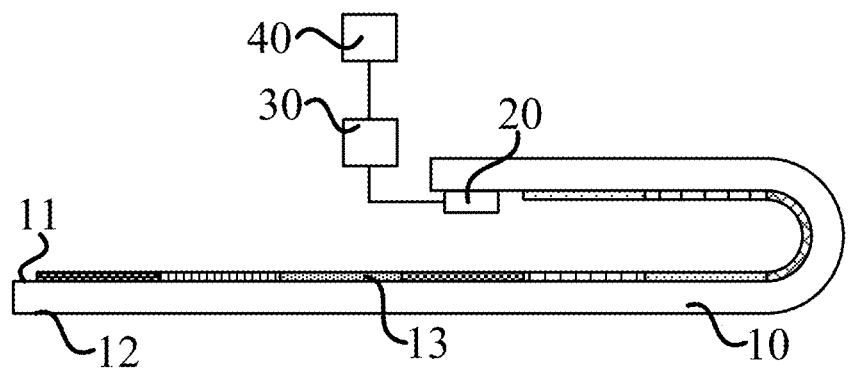
FIG. 8 is a diagram illustrating the structure of another foldable display device according to an embodiment of the present invention.

In an embodiment, FIG. 8 is a diagram illustrating the structure of another foldable display device according to an embodiment of the present invention. Table 1 is a folded state lookup table according to this embodiment of the present invention. As shown in FIG. 8 and Table 1, the foldable display device also includes a storage unit 40. A preset folded state lookup table is stored in the storage unit 40. The folded state lookup table includes a mapping relationship between characteristic information and a folded state. A driving display unit 30 is also configured to determine a folded state of a foldable screen 10 in the folded state lookup table according to characteristic information of an alignment image 13 in the opposed region of an image sensor 20. In Table 1, the folded state is taken as the folded position as an example. Further, the characteristic information includes display brightness and/or display chroma. Display brightness and/or display chroma of the alignment image 13 are different in at least two different regions. The folded state lookup table includes a mapping relationship of display chroma, display brightness, and a folded state. The driving display unit 30 is also configured to determine a folded state of the foldable screen 10 in the folded state lookup table according to display chroma and/or display brightness of the alignment image 13 in the opposed region of the image sensor 20.

TABLE 1

| Display Chroma Parameter x | Display Chroma Parameter y | Display Brightness Parameter Lv | Folded Position |
|---|---|---|---|
| (x11, x12) | (y11, y12) | (0, Lv11) | x1 |
| (x11, x12) | (y11, y12) | (Lv11, Lv12) | x2 |
| (x11, x12) | (y11, y12) | (Lv12, Lv13) | x3 |
| (x21, x22) | (y21, y22) | (0, Lv21) | x4 |
| (x21, x22) | (y21, y22) | (Lv21, Lv22) | x5 |
| (x21, x22) | (y21, y22) | (Lv22, Lv23) | x6 |
| (x31, x32) | (y31, y32) | (0, Lv31) | x7 |
| (x31, x32) | (y31, y32) | (Lv31, Lv32) | x8 |
| (x31, x32) | (y31, y32) | (Lv32, Lv33) | x9 |

Specifically, the foldable display device also includes a storage unit 40. The position of the storage unit 40 shown in FIG. 4 is only an example. The storage unit 40 is integrated on the internal mainboard of the foldable display device. A preset folded state lookup table is stored in the storage unit 40. The folded state lookup table includes a mapping relationship between characteristic information and a folded state. The characteristic information includes display brightness and/or display chroma. That is, the folded state lookup table includes a mapping relationship of display chroma, display brightness, and a folded state. Display brightness and/or display chroma of the alignment image 13 are different in at least two different regions. Exemplarily, with continued reference to Table 1, the folded state lookup table includes characteristic information of a display chroma parameter x, a display chroma parameter y, and a display brightness parameter Lv. Each group of the characteristic information has a mapping relationship with one folded position. Exemplarily, the alignment image 13 preset in the foldable screen 10 may include three large regions. Display chroma of the three large regions may be red, green, and blue, respectively. Display chroma of different large areas is different. The same number of interval ranges of the display chroma parameter x corresponding to the number of three large regions and the same number of interval ranges of the display chroma parameter y corresponding to the number of three large regions are set in the folded state lookup table. An interval range may include display chroma of a corresponding large region, or the center of an interval range may be the display chroma of a corresponding large region. That is, when the display chroma of the alignment image 13 in the opposed region of the image sensor 20 collected by the image sensor 20 after the foldable screen 10 is folded is located in an interval range of the display chroma parameter x and an interval range of the display chroma parameter y at the same time, the position of the opposed region of the image sensor 20 is determined to be located in this large region. Exemplarily, each large region may include three small regions. Display chroma of different small regions in the same large region is the same, and display brightness of different small regions in the same large region is different. The same number of interval ranges of the display brightness parameter Lv corresponding to the number of three small regions is set in the folded state lookup table. An interval range may include display brightness of a corresponding small region, or the center of an interval range may be the display brightness of a corresponding small region. That is, the display brightness of the alignment image 13 in the opposed region of the image sensor 20 collected by the image sensor 20 after the foldable screen 10 is folded is located in an interval range of the display brightness parameter Lv, the position of the opposed region of the image sensor 20 is determined to be located in this small region. Exemplarily, when the characteristic information of the alignment image 13 in the opposed region of the image sensor 20 collected by the image sensor 20 after the foldable screen 10 is folded satisfies the display chroma parameter x∈(x11, x12), the display chroma parameter y∈(y11, y12), and the display brightness parameter Lv∈(0, Lv11), the folded position of the foldable screen 10 can be directly determined as x1. It is to be noted that the folded state lookup table includes characteristic information of the display chroma parameter x, the display chroma parameter y, and the display brightness parameter Lv. The display chroma parameter x, the display chroma parameter y, and the display brightness parameter Lv are each set to be an interval range. In this case, the folded position of the foldable screen 10 determined through the folded state lookup table is a region and cannot be accurate to one pixel point. In addition, it is to be noted that, the example in Table 1 includes three large regions. Display chroma of different large regions is different, so interval ranges of the display chroma parameters x and y of the different large regions are different. Moreover, each large region includes three small regions. Display chroma of the three small regions is the same, so interval ranges of the display chroma parameters x and y of the three small regions are the same. Display brightness of the three small regions is different, so interval ranges of the display brightness parameter Lv of the three small regions are different. The range setting manner of the display chroma parameter and display brightness parameter in Table 1 is only an example. In other embodiments of the present invention, a parameter range may be correspondingly set according to region division and region difference. This is not limited herein.

Figure 9:
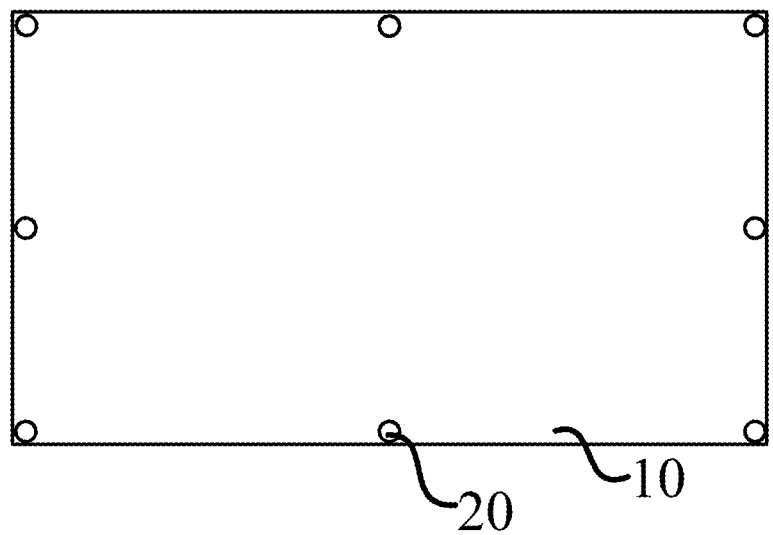
FIG. 9 is a diagram illustrating arrangement positions of image sensors according to an embodiment of the present invention.

In an embodiment, FIG. 9 is a diagram illustrating arrangement positions of image sensors according to an embodiment of the present invention. As shown in FIG. 9, multiple image sensors 20 are provided. A foldable screen 10 includes multiple corners and multiple sides. At least part of the image sensors 20 are located at corners in a one-to-one manner, and at least part of the image sensors 20 are located at midpoints of sides in a one-to-one manner.

Specifically, multiple image sensors 20 may be provided. The foldable screen includes multiple corners and multiple sides. At least part of the image sensors 20 are located at corners in a one-to-one manner, and at least part of the image sensors 20 are located at midpoints of sides in a one-to-one manner. Exemplarily, one image sensor 20 may be disposed at each corner of the foldable screen. The image sensor 20 can detect a folded state of a corresponding corner. One image sensor 20 may be disposed at the midpoint of each side of the foldable screen. The image sensor 20 can detect a folded state of a corresponding side. One image sensor 20 may also be disposed between each corner of the foldable screen and the midpoint of each side adjacent to the corner, thereby detecting various folded states occurring on the foldable screen. That is, to detect various folded states occurring on the foldable screen, an image sensor 20 should be disposed at at least on one corner or one edge of the foldable screen where the folded state changes. Exemplarily, at least two image sensors 20 may be disposed on each side of the foldable screen. The image sensors 20 can detect the folded state of each position on the foldable screen. The use of multiple image sensors 20 can avoid the case where the folded state on the foldable screen cannot be determined or erroneously detected.

Further, to avoid the situation that the image sensors cannot be aligned with a display screen due to the small number of image sensors and the special folded manner, in other embodiments of the present invention, at least part of image sensors may be disposed between the midpoint and an end point of at least one side. That is, image sensors are disposed on the side of the foldable screen besides the midpoint and end point of the side to increase the setting density of image sensors, ensure that at least part of image sensors can be aligned with the display screen, and collect and obtain an alignment image to determine the folded state.

In addition, corresponding to the complex alignment image on the foldable screen, the complex alignment image is divided into regions. Characteristic information of each region is different. An image sensor 20 can collect the alignment image in the opposed region of the image sensor 20 after the foldable screen is folded. A driving display unit can match the alignment image collected by the image sensor 20 with characteristic information pre-stored in each region to determine the position of the opposed region of the image sensor 20. The pre-stored characteristic information of each region can be determined by dividing the complex alignment image into regions or by dividing a screenshot of an application interface in the use process of a user into regions and determining and storing characteristic information of each region of the screenshot.

In an embodiment, with continued reference to FIG. 9, an image sensor 20 includes an optical imaging system and a photosensitive chip. The optical imaging system is located on the photosensitive side of the photosensitive chip.

Specifically, the image sensor 20 may be a camera. The image sensor 20 includes an optical imaging system and a photosensitive chip. The optical imaging system is located on the photosensitive side of the photosensitive chip. The optical imaging system can perform imaging collection on the alignment image in the opposed region of the image sensor 20 after the foldable screen is folded. The photosensitive chip can analyze the alignment image collected after the imaging of the optical imaging system to determine characteristic information of the alignment image such as display brightness and/or display chroma.

In an embodiment, with continued reference to FIG. 9, an image sensor 20 includes multiple photoresistors. The multiple photoresistors include at least two photoresistors of different photosensitive colors.

Specifically, an image sensor 20 may be a micro camera. The image sensor 20 includes multiple photoresistors. The photoresistors can change resistance values of the photoresistors in accordance with the intensity of the incident light. The multiple photoresistors include at least two photoresistors of different photosensitive colors. Display chroma can be determined according to induction signals of photoresistors of different photosensitive colors. Display brightness can be determined according to the intensity of induction signals of the multiple photoresistors, thereby completing collection of characteristic information of the alignment image in the opposed region of the image sensor 20 after the foldable screen is folded.

Figure 10:
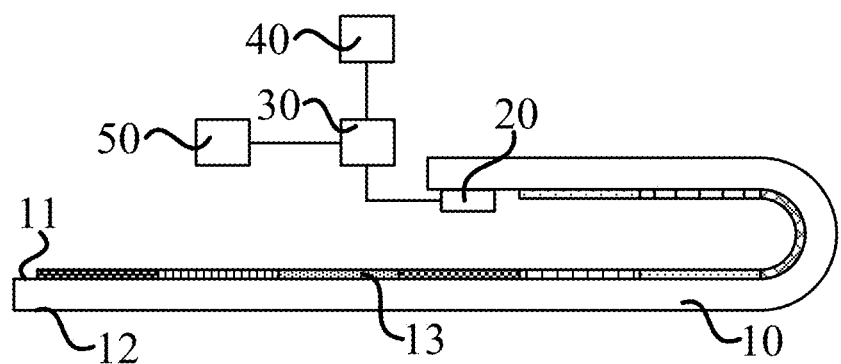
FIG. 10 is a diagram illustrating the structure of another foldable display device according to an embodiment of the present invention.

In an embodiment, FIG. 10 is a diagram illustrating the structure of another foldable display device according to an embodiment of the present invention. As shown in FIG. 10, the foldable display device also includes a folded angle detection unit 50. The folded angle detection unit 50 is electrically connected to a driving display unit 30. The folded angle detection unit 50 is configured to detect a folded action and/or a folded angle of a foldable screen 10. The driving display unit 30 is configured to determine a folded action of the foldable screen 10 before determining the position of the opposed region of an image sensor 20 according to the characteristic information of the alignment image 13 in the opposed region of the image sensor 20. Moreover/alternatively, the driving display unit 30 is configured to correct the position of the opposed region of the image sensor 20 according to a folded angle of the foldable screen 10. Further, the folded angle detection unit 50 includes a strain resistor. The strain resistor is disposed on at least one side of the foldable screen 10.

Specifically, the foldable display device also includes a folded angle detection unit 50. The position of the folded angle detection unit 50 shown in FIG. 10 is only an example. The folded angle detection unit 50 is integrated on the internal mainboard of the foldable display device. The folded angle detection unit 50 may include a strain resistor. The strain resistor is disposed on at least one side of the foldable screen 10. A change in the resistance value of the strain resistor indicates that a folded action occurs on the foldable screen 10. Exemplarily, a strain resistor may be disposed on each side of the foldable screen 10. When a strain resistor detects a folded action of a side of the foldable screen 10 on which the strain resistor is located, the strain resistor can trigger a detection process of a folded state of the foldable screen 10. That is, the image sensor 20 starts to acquire the alignment image 13 in the opposed region of the image sensor 20 after the foldable screen 10 is folded. The folded angle detection unit 50 can detect a folded action of the foldable screen 10 through the strain resistor. Moreover, the folded angle detection unit 50 can also detect a folded angle of the foldable screen 10 through feedback information of the strain resistor. When the folded angle of the foldable screen 10 is not zero, that is, the foldable screen 10 is not completely folded, the folded angle of a folded portion and the folded angle of an unfolded portion can be obtained through different stress applied to the strain resistor under different folded angles and the different changes of the resistance value of the strain resistor. The driving display unit 30 can compensate display brightness and/or display chroma in the process in which the image sensor 20 acquires the alignment image 13 in the opposed region of the image sensor 20 after the foldable screen 10 is folded, which is helpful to improve the detection accuracy of the folded state of the foldable screen 10.

Figure 11:
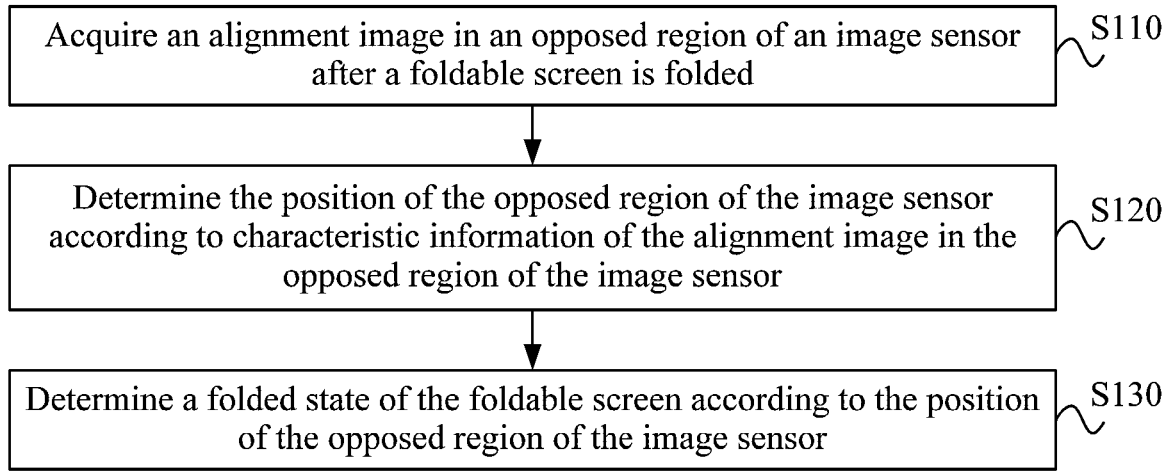
FIG. 11 is a flowchart of a driving method of a foldable display device according to an embodiment of the present invention.

Based on the same inventive concept, an embodiment of the present invention provides a driving method of a foldable display device. A foldable display device includes a foldable screen and an image sensor. The foldable screen includes a first surface and a second surface which are disposed oppositely along the thickness direction of the foldable screen. The first surface or the second surface is a target display surface. At least one of the first surface and the second surface displays an alignment image. The alignment image has different pieces of characteristic information in at least two different regions. The image sensor is located at the edge of the foldable screen. FIG. 11 is a flowchart of a driving method of a foldable display device according to an embodiment of the present invention. As shown in FIG. 11, the driving method includes the following steps.

In S110, an alignment image in an opposed region of an image sensor after a foldable screen is folded is acquired.

Specifically, with continued reference to FIG. 2, at least one of the first surface 11 and the second surface 12 of the foldable screen 10 displays the alignment image 13. The alignment image 13 is preset in the foldable screen 10. The image sensor 20 is disposed at the edge of the foldable screen 10. The image sensor 20 can change position in accordance with a folded action of the foldable screen 10. After the foldable screen 10 is folded, the image sensor 20 can collect the alignment image 13 in the opposed region of the image sensor 20 after the foldable screen 10 is folded.

In S120, the position of the opposed region of the image sensor is determined according to characteristic information of the alignment image in the opposed region of the image sensor.

Specifically, with continued reference to FIG. 2, the driving display unit 30 is electrically connected to the image sensor 20. After the image sensor 20 acquires the alignment image 13 in the opposed region of the image sensor 20 after the foldable screen 10 is folded, the driving display unit 30 can determine the position of the opposed region of the image sensor 20 according to the characteristic information of the alignment image 13 in the opposed region of the image sensor 20. The alignment image 13 has different pieces of characteristic information in at least two different regions. That is, characteristic information of different alignment images 13 collected by the image sensor 20 corresponds to different positions of the opposed region of the image sensor 20.

In S130, a folded state of the foldable screen is determined according to the position of the opposed region of the image sensor.

Specifically, with continued reference to FIG. 2, after the position of the opposed region of the image sensor 20 is determined, the driving display unit 30 can also determine a folded state of the foldable screen 10 according to the position of the opposed region of the image sensor 20. Exemplarily, a folded state of the foldable screen 10 includes information such as a folded position, a folded angle, and a folding line, thereby implementing automatic detection of a folded state of the foldable screen 10. Further, driving display adapting to the folded state is performed, the intelligent degree of the foldable screen 10 is improved, and the use experience of a user is improved. At the same time, it is to be noted that only the image sensor 20 and the alignment image 13 are used in the automatic detection process of a folded state of the foldable screen 10, thereby avoiding a complicated mechanical structure. This implementation manner is simpler and more feasible.

According to the technical solution in this embodiment of the present invention, an alignment image in an opposed region of an image sensor after a foldable screen is folded is first acquired. Then, the position of the opposed region of the image sensor is determined according to characteristic information of the alignment image in the opposed region of the image sensor. Finally, a folded state of the foldable screen is determined according to the position of the opposed region of the image sensor. By using the preceding method, the image sensor is used to collect the alignment image in the opposed region of the image sensor after the foldable screen is folded. The driving display unit is used to determine a position of the opposed region of the image sensor according to characteristic information of the alignment image in the opposed region of the image sensor and determine a folded state of the foldable screen according to the position of the opposed region of the image sensor. Thus, the detection accuracy and automation of the folded state of the foldable screen can be improved, the situation that an existing foldable display device cannot automatically detect a folded state or cannot automatically adapt to a folded state for display, or a detection mechanism of a folded state is complex is solved, the intelligent degree of the foldable screen is improved, and the use experience of a user is improved. Moreover, the driving display unit is used to determine a position of the opposed region of the image sensor according to characteristic information of the alignment image in the opposed region of the image sensor and determine a folded state of the foldable screen according to the position of the opposed region of the image sensor. Further, driving display and optimizing application are performed to adapt to the folded state, which is beneficial to reducing the display power consumption of the foldable screen.

Figure 12:
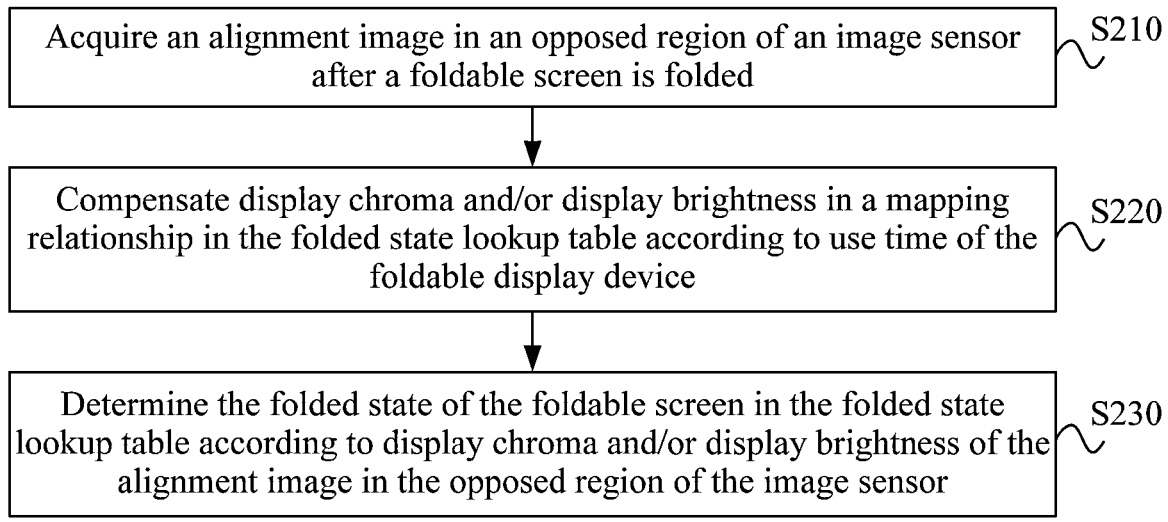
FIG. 12 is a flowchart of another driving method of a foldable display device according to an embodiment of the present invention.

FIG. 12 is a flowchart of another driving method of a foldable display device according to an embodiment of the present invention. This embodiment is optimized on the basis of the preceding embodiment. In an embodiment, characteristic information includes display brightness and/or display chroma. Display brightness and/or display chroma of an alignment image are different in at least two different regions.

Determining the position of the opposed region of the image sensor according to characteristic information of the alignment image in the opposed region of the image sensor includes determining the position of the opposed region of the image sensor according to display chroma and/or display brightness of the alignment image in the opposed region of the image sensor.

Further, the foldable display device also includes a storage unit. A preset folded state lookup table is stored in the storage unit. The folded state lookup table includes a mapping relationship of display chroma, display brightness, and a folded state.

The position of the opposed region of the image sensor is determined according to characteristic information of the alignment image in the opposed region of the image sensor.

Determining the folded state of the foldable screen according to the position of the opposed region of the image sensor includes determining the folded state of the foldable screen in the folded state lookup table according to display chroma and/or display brightness of the alignment image in the opposed region of the image sensor.

Further, before determining the folded state of the foldable screen in the folded state lookup table according to display chroma and/or display brightness of the alignment image in the opposed region of the image sensor, the method also includes compensating display chroma and/or display brightness in a mapping relationship in the folded state lookup table according to use time of the foldable display device.

For the content that is not yet exhaustive in this embodiment, reference may be made to the preceding embodiment. As shown in FIG. 12, the driving method includes the following steps.

In S210, an alignment image in an opposed region of an image sensor after a foldable screen is folded is acquired.

In S220, display chroma and/or display brightness in a mapping relationship in the folded state lookup table are compensated according to use time of the foldable display device.

Specifically, with continued reference to FIG. 8, the storage unit 40 stores a preset folded state lookup table. The folded state lookup table includes a mapping relationship of display chroma, display brightness, and a folded state. The display chroma parameter and the display brightness parameter in the folded state lookup table are each an interval range. When the folded state lookup table is set, errors such as brightness attenuation and chroma shift of the foldable screen 10 can be compensated in an interval range. According to use time of a foldable display device, when the use time of the foldable display device is too long, the foldable screen 10 may have a change in display chroma and/or display brightness (for example, Always on display or a decrease in brightness). Exemplarily, when the interval range of the display brightness parameter is set, compensation for brightness attenuation of the foldable screen 10 with time can be added. When the interval range of the display chroma parameter is set, compensation for chroma shift of the foldable screen 10 with time can be added. Thus, it is possible to avoid a case in which the collection accuracy is low when an image sensor 20 collects the alignment image 13 in the opposed region of the image sensor 20 after the foldable screen 10 is folded, or the folded state of the foldable screen 10 is detected incorrectly when the display brightness and/or the display chroma of the foldable screen 10 are changed during the collection process, which is helpful to improve the detection accuracy of the folded state of the foldable screen 10.

In S230, the folded state of the foldable screen is determined in the folded state lookup table according to display chroma and/or display brightness of the alignment image in the opposed region of the image sensor.

Specifically, with continued reference to FIG. 8, after the characteristic information of the opposed region of the image sensor 20 is determined, a driving display unit 30 can also determine the folded state of the foldable screen 10 in the folded state lookup table according to the display chroma and/or the display brightness of the alignment image 13 in the opposed region of the image sensor 20. Exemplarily, the folded state of the foldable screen 10 includes information such as a folded position, a folded angle, and a folding line. One group of determined interval ranges of the display chroma parameter and display brightness parameter corresponds to one folded position. It is to be noted that the folded state lookup table is preset according to an interval range of a standard display chroma parameter and an interval range of a standard display brightness parameter. In a subsequent process of detecting the folded state of the foldable screen 10, a data calculation process does not need to be performed again. The folded position of the foldable screen 10 can be directly determined according to the comparison of interval ranges of parameters in the folded state lookup table, thereby solving the problems of a large amount of data calculation, a complex process, large power consumption, and long time consumption caused by real-time processing of data required for detecting the folded state of an existing foldable screen 10.

According to the technical solution in this embodiment of the present invention, an alignment image in an opposed region of an image sensor after a foldable screen is folded is first acquired. Then, the position of the opposed region of the image sensor is determined according to display chroma and/or display brightness of the alignment image in the opposed region of the image sensor. Display chroma and/or display brightness in a mapping relationship in the folded state lookup table are compensated according to use time of the foldable display device. Finally, the folded state of the foldable screen is determined in the folded state lookup table according to display chroma and/or display brightness of the alignment image in the opposed region of the image sensor. According to the preceding method, by comparing interval ranges of the display chroma parameter and/or interval ranges of the display brightness parameter in the folded state lookup table, the folded position of the foldable screen can be directly determined. Moreover, the interval ranges in the folded state lookup table can compensate the display chroma and/or the display brightness. Thus, the detection accuracy of the folded state of the foldable screen is improved, and the problems of a large amount of data calculation, a complex process, large power consumption, and long time consumption caused by real-time processing of data required for detecting the folded state of an existing foldable screen are solved.

Figure 13:
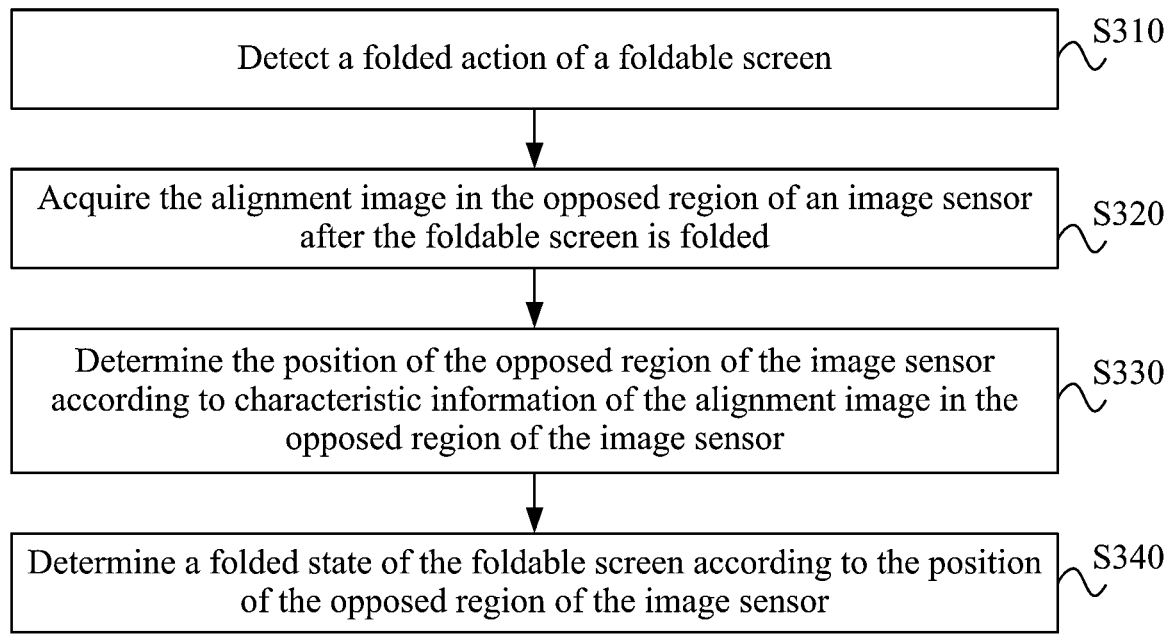
FIG. 13 is a flowchart of another driving method of a foldable display device according to an embodiment of the present invention.

FIG. 13 is a flowchart of another driving method of a foldable display device according to an embodiment of the present invention. This embodiment is optimized on the basis of the preceding embodiments. In an embodiment, before the alignment image in the opposed region of the image sensor after the foldable screen is folded is acquired, the method also includes detecting a folded action of the foldable screen.

For the content that is not yet exhaustive in this embodiment, reference may be made to the preceding embodiments. As shown in FIG. 13, the driving method includes the following steps.

In S310, a folded action of a foldable screen is detected.

Specifically, with continued reference to FIG. 10, the folded angle detection unit 50 is electrically connected to the driving display unit 30. The folded angle detection unit 50 can detect a folded action of the foldable screen 10. Exemplarily, the folded angle detection unit 50 may be a strain resistor. The strain resistor triggers the detection process of the folded state of the foldable screen 10 when the strain resistor detects that the side of the foldable screen 10 on which the strain resistor is located is bent. That is, the image sensor 20 starts to acquire the alignment image 13 in the opposed region of the image sensor 20 after the foldable screen 10 is folded. The folded angle detection unit 50 can also detect the folded angle of the foldable screen 10. When the foldable screen 10 is not completely folded, at this time, the alignment image 13 in the opposed region of the image sensor 20 acquired by the image sensor 20 is not the alignment image 13 at the vertical projection of the image sensor 20 on the plane in which the foldable screen 10 is located. The driving display unit 30 can compensate the chroma and brightness of the opposed region of the image sensor 20 according to the folded angle of the foldable screen 10. The alignment image 13 at the vertical projection of the image sensor 20 on the plane in which the foldable screen 10 is located can be determined, which is helpful to improve the detection accuracy of the folded state of the foldable screen 10.

In S320, the alignment image in the opposed region of an image sensor after the foldable screen is folded is acquired.

In S330, the position of the opposed region of the image sensor is determined according to characteristic information of the alignment image in the opposed region of the image sensor.

In S340, a folded state of the foldable screen is determined according to the position of the opposed region of the image sensor.

According to the technical solution in this embodiment of the present invention, the contents that the folded action of the foldable screen needs to be detected before acquiring the alignment image in the opposed region of the image sensor after the foldable screen is folded are described in detail. The folded angle detection unit 50 can detect the folded action of the foldable screen. Only after detecting the folded action of the foldable screen, the folded angle detection unit 50 can trigger the detection process of the folded state of the foldable screen. The folded angle detection unit 50 can also detect the folded angle of the foldable screen and according to the folded angle, correct the position of the opposed region of the image sensor, which is helpful to improve the detection accuracy of the folded state of the foldable screen.

Figure 14:
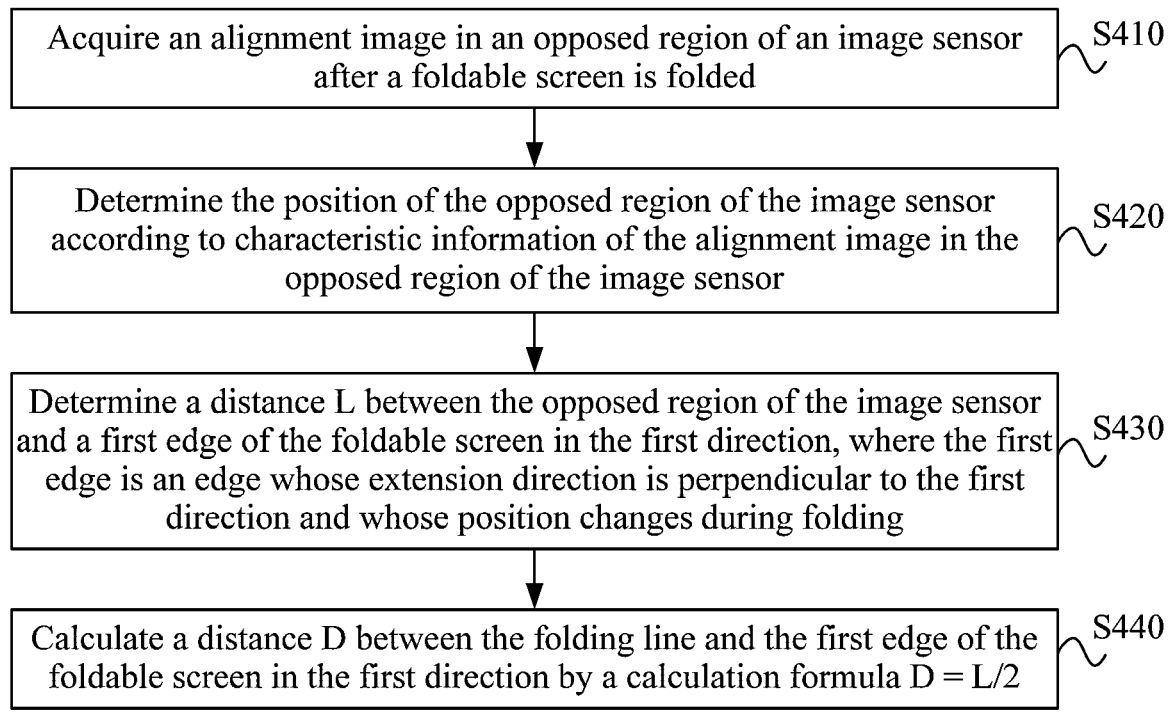
FIG. 14 is a flowchart of another driving method of a foldable display device according to an embodiment of the present invention.

FIG. 14 is a flowchart of another driving method of a foldable display device according to an embodiment of the present invention. This embodiment is optimized on the basis of the preceding embodiments. In an embodiment, a foldable screen includes a folding line. The folding line is formed by folding the foldable screen. In a first direction, characteristic information of at least two different regions in an alignment image is different. The first direction is perpendicular to the extension direction of the folding line.

Determining the folded state of the foldable screen according to the position of the opposed region of the image sensor includes determining a distance L between the opposed region of the image sensor and a first edge of the foldable screen in the first direction, where the first edge is an edge whose extension direction is perpendicular to the first direction and whose position changes during folding; and calculating a distance D between the folding line and the first edge of the foldable screen in the first direction by a calculation formula $D=L/2$.

For the content that is not yet exhaustive in this embodiment, reference may be made to the preceding embodiments. As shown in FIG. 14, the driving method includes the following steps.

In S410, an alignment image in an opposed region of an image sensor after a foldable screen is folded is acquired.

In S420, the position of the opposed region of the image sensor is determined according to characteristic information of the alignment image in the opposed region of the image sensor.

In S430, a distance L between the opposed region of the image sensor and a first edge of the foldable screen in the first direction is determined. The first edge is an edge whose extension direction is perpendicular to the first direction and whose position changes during folding.

Specifically, with continued reference to FIG. 3, in the case of positive folding (the folding line 14 is parallel to at least one side of the foldable screen 10), after the position of the opposed region of the image sensor 20 is determined, the distance L between the opposed region of the image sensor 20 and a first edge 16 of the foldable screen 10 in the first direction X also needs to be determined. The first edge 16 is an edge whose extension direction is perpendicular to the first direction and whose position changes during folding. An image sensor 20 is disposed at the first edge 16.

In S440, a distance D between the folding line and the first edge of the foldable screen in the first direction is calculated by a calculation formula $D=L/2$.

Specifically, with continued reference to FIG. 3, the foldable screen 10 includes the folding line 14. The folding line 14 is formed by folding the foldable screen 10. The folding line 14 coincides with the midperpendicular of a line connecting the positions of the image sensor 20 before and after folding. In the first direction X, the first direction X is perpendicular to the extension direction of the folding line 14. According to the calculation formula $D=L/2$, the distance D between the folding line 14 and the first edge 16 of the foldable screen 10 in the first direction X can be calculated. That is, the distance D between the folding line 14 and the first edge 16 of the foldable screen 10 in the first direction X is half of the distance L between the opposed region of the image sensor 20 and the first edge 16 of the foldable screen 10 in the first direction X.

According to the technical solution in this embodiment of the present invention, in the case of positive folding, the content that the folding line in the folded state of the foldable screen is determined according to the position of the opposed region of the image sensor is described in detail. First, a distance L between the opposed region of the image sensor and a first edge of the foldable screen in a first direction is determined. The foldable screen includes a first edge in the first direction. The extension direction of the first edge is perpendicular to the first direction. Then, a distance D between the folding line and the first edge of the foldable screen in the first direction is calculated by the calculation formula $D=L/2$. According to the preceding method, it is possible to obtain that the distance D between the folding line and the first edge of the foldable screen in the first direction is half of the distance L between the opposed region of the image sensor and the first edge of the foldable screen in the first direction, thereby facilitating accurate determination of the position of the folding line on the foldable screen. In some embodiments, the distance L between the opposed region of the image sensor and the first edge of the foldable screen in the first direction may be determined according to the folded state lookup table in Table 1. For example, when the foldable screen is in the flat state, the folded position is 0. When the foldable screen is in the folded state, the folded position is x1. Then, $L=x1$, and $D=x1/2$.

Figure 15:
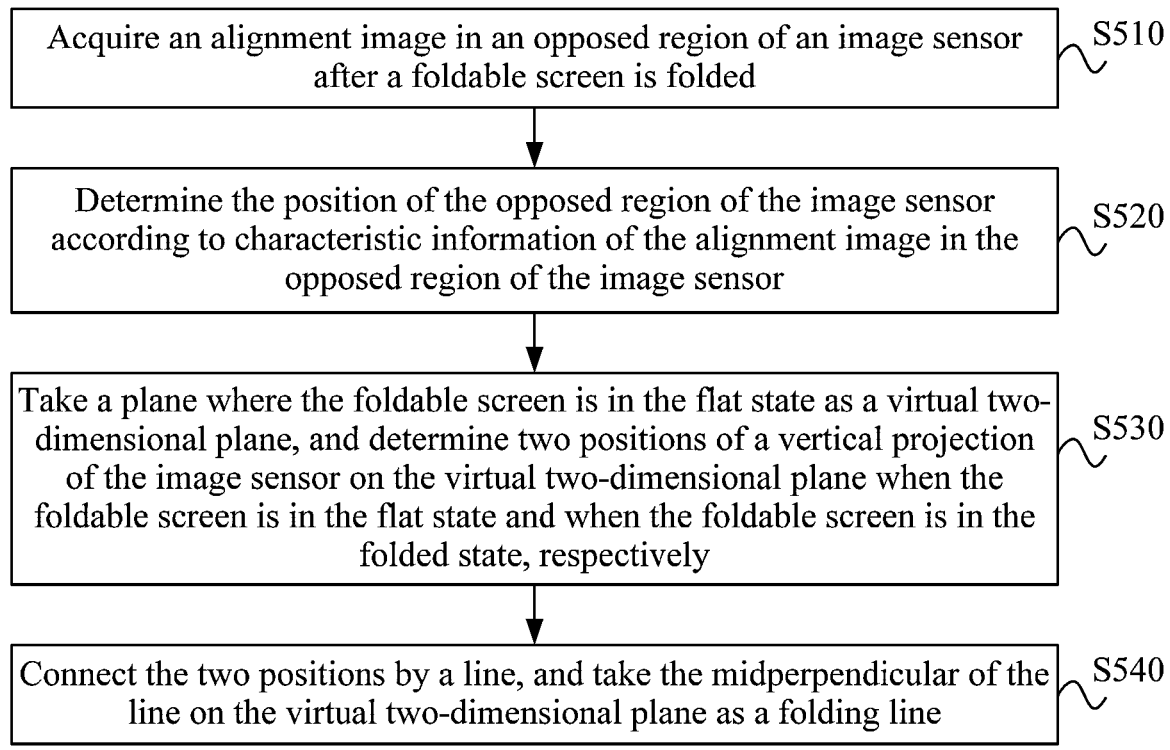
FIG. 15 is a flowchart of another driving method of a foldable display device according to an embodiment of the present invention.

FIG. 15 is a flowchart of another driving method of a foldable display device according to an embodiment of the present invention. This embodiment is optimized on the basis of the preceding embodiments. In an embodiment, determining the folded state of the foldable screen according to the position of the opposed region of the image sensor includes taking a plane where the foldable screen is in the flat state as a virtual two-dimensional plane, and determining two positions of a vertical projection of the image sensor on the virtual two-dimensional plane when the foldable screen is in the flat state and when the foldable screen is in the folded state, respectively; and connecting the two positions by a line, and taking a midperpendicular of the line on the virtual two-dimensional plane as a folding line.

For the content that is not yet exhaustive in this embodiment, reference may be made to the preceding embodiments. As shown in FIG. 15, the driving method includes the following steps.

In S510, an alignment image in an opposed region of an image sensor after a foldable screen is folded is acquired.

In S520, the position of the opposed region of the image sensor is determined according to characteristic information of the alignment image in the opposed region of the image sensor.

In S530, a plane where the foldable screen is in the flat state is taken as a virtual two-dimensional plane, and two positions of a vertical projection of the image sensor on the virtual two-dimensional plane when the foldable screen is in the flat state and when the foldable screen is in the folded state, respectively, are determined.

Specifically, with continued reference to FIG. 4, in the case of non-positive folding (the folding line 14 is not parallel to any side of the foldable screen 10), a plane where the foldable screen is in the flat state is taken as a virtual two-dimensional plane. Multiple image sensors 20 can be disposed at the edge of the foldable screen 10. For an image sensor 20 capable of acquiring the alignment image 13 after the foldable screen 10 is folded, after the position of the vertical projection of the image sensor 20 on the virtual two-dimensional plane when the foldable screen 10 is in the folded state is determined, the position of the vertical projection of the image sensor 20 on the virtual two-dimensional plane when the foldable screen 10 is in the flat state also needs to be determined.

In S540, the two positions are connected by a line, and the midperpendicular of the line on the virtual two-dimensional plane is taken as a folding line.

Specifically, with continued reference to FIG. 4, two positions of a vertical projection of the image sensor 20 on the virtual two-dimensional plane when the foldable screen 10 is in the flat state and when the foldable screen 10 is in the folded state, respectively, are connected by a line on the virtual two-dimensional plane. The midperpendicular of the line on the virtual two-dimensional plane is the folding line 14, thereby facilitating accurate determination of the position of the folding line 14 on the foldable screen 10.

In some embodiments, the position of the vertical projection of the image sensor 20 on the virtual two-dimensional plane when the foldable screen is in the folded state can be determined according to a folded state lookup table. The folded state lookup table is another type different from that in Table 1. In the folded state lookup table, a folded position needs to include coordinates composed of Y and Z, for example, (Y1, Z1). The initial coordinates of the position of the vertical projection of the image sensor 20 on the virtual two-dimensional plane when the foldable screen is in the flat state are (Y0, Z0). Thus, the preceding midperpendicular can be determined according to the two coordinates, that is, the folding line is determined. Accordingly, in the preceding embodiments, the alignment image corresponding to the folded state lookup table may be the image in which both chroma and brightness change in both the Y and Z directions shown in FIG. 7.

According to the technical solution in this embodiment of the present invention, in the case of non-positive folding, the content that the folding line in the folded state of the foldable screen is determined according to the position of the opposed region of the image sensor is described in detail. First, two positions of the image sensor on the virtual two-dimensional plane when the foldable screen is in the flat state and when the foldable screen is in the folded state, respectively, are determined. Then, the two positions are connected by a line. The midperpendicular of the line on the virtual two-dimensional plane is taken as a folding line. According to the preceding method, the position of the folding line in any folded state can be accurately determined according to two positions of the image sensor on the virtual two-dimensional plane when the foldable screen is in the flat state and when the foldable screen is in the folded state, respectively.

Figure 16:
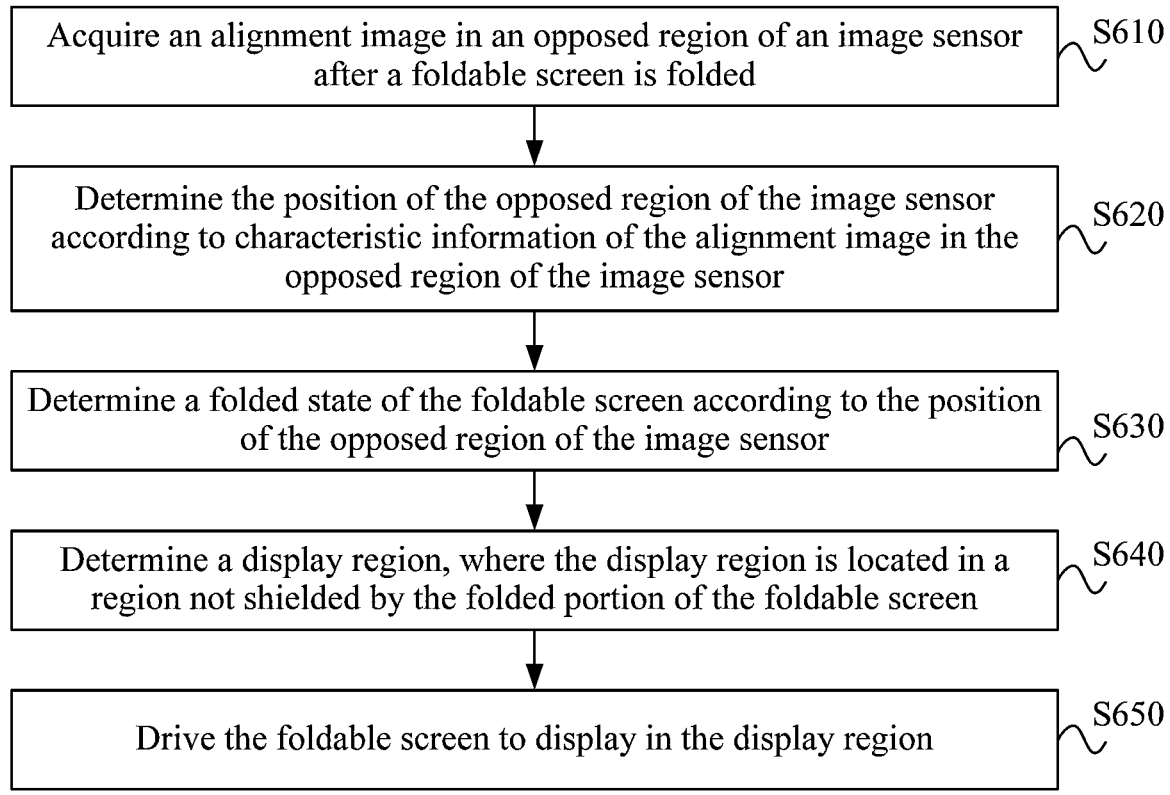
FIG. 16 is a flowchart of another driving method of a foldable display device according to an embodiment of the present invention.

FIG. 16 is a flowchart of another driving method of a foldable display device according to an embodiment of the present invention. This embodiment is optimized on the basis of the preceding embodiments. In an embodiment, after determining the folded state of the foldable screen according to the position of the opposed region of the image sensor, the method also includes determining a display region, where the display region is located in a region not shielded by a folded portion of the foldable screen; and driving the foldable screen to display in the display region.

For the content that is not yet exhaustive in this embodiment, reference may be made to the preceding embodiments. As shown in FIG. 16, the driving method includes the following steps.

In S610, an alignment image in an opposed region of an image sensor after a foldable screen is folded is acquired.

In S620, the position of the opposed region of the image sensor is determined according to characteristic information of the alignment image in the opposed region of the image sensor.

In S630, a folded state of the foldable screen is determined according to the position of the opposed region of the image sensor.

In S640, a display region is determined. The display region is located in a region not shielded by the folded portion of the foldable screen.

Figure 17:
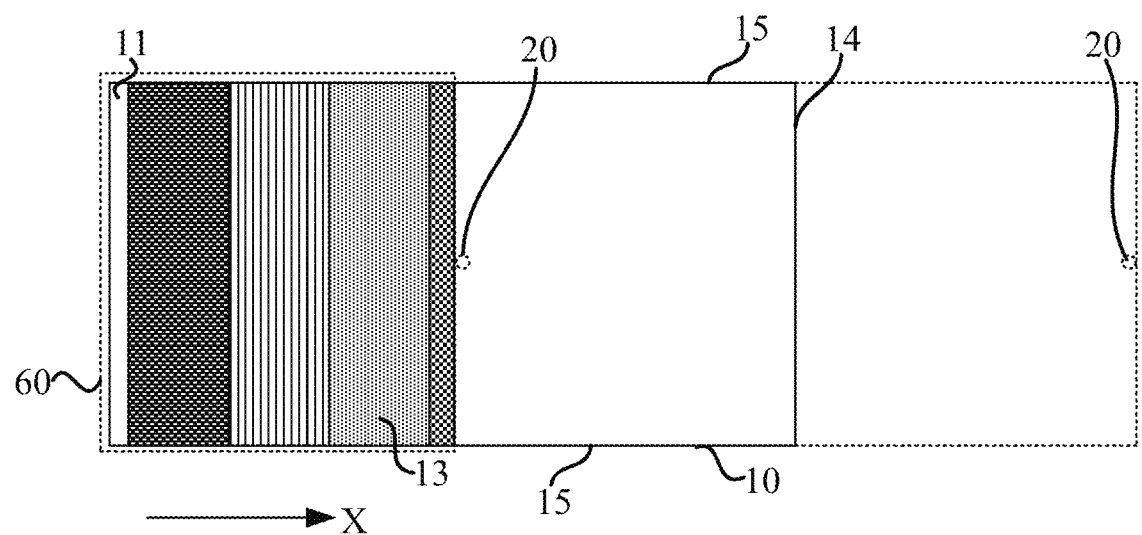
FIG. 17 is a diagram illustrating the structure of another foldable display device according to an embodiment of the present invention.

Specifically, FIG. 17 is a diagram illustrating the structure of another foldable display device according to an embodiment of the present invention. As shown in FIG. 17, after the folded state of a foldable screen 10 is determined, the foldable screen 10 can be optimized according to the folded state of the foldable screen 10 to further determine a display region 60 of the foldable screen 10. The display region 60 is located in a region not shielded by the folded portion of the foldable screen 10. Thus, a user can normally view the application picture on the foldable screen 10.

In S650, the foldable screen is driven to display in the display region.

Specifically, with continued reference to FIG. 17, after the display region 60 is determined, a driving display unit 30 can drive the foldable screen 10 to display in the display region 60. Thus, normal playing and user viewing of an application picture on the foldable screen 10 can be ensured, and application power consumption of the foldable screen 10 can be reduced.

According to the technical solution in this embodiment of the present invention, the content that, after the folded state of the foldable screen is determined according to the position of the opposed region of the image sensor, the display region needs to be determined is described in detail. The display region is located in a region not shielded by the folded portion of the foldable screen. Then, the foldable screen is driven to display in the display region. According to the preceding method, the region not shielded by the folded portion of the foldable screen is used as the display region. The folded portion of the foldable screen does not display an application picture. Thus, normal playing and user viewing of an application picture on the foldable screen can be ensured, and application power consumption of the foldable screen can be reduced.

It is to be noted that the preceding are only preferred embodiments of the present invention and the technical principles used therein. It is to be understood by those skilled in the art that the present invention is not limited to the embodiments described herein. For those skilled in the art, various apparent modifications, adaptations, combinations, and substitutions can be made without departing from the scope of the present invention. Therefore, while the present invention has been described in detail via the preceding embodiments, the present invention is not limited to the preceding embodiments and may include more equivalent embodiments without departing from the inventive concept of the present invention. The scope of the present invention is determined by the scope of the appended claims.

What is claimed is:

1. A foldable display device, comprising:
a foldable screen comprising a first surface and a second surface which are disposed oppositely along a thickness direction of the foldable screen, wherein the first surface or the second surface is a target display surface, and at least one of the first surface and the second surface displays an alignment image, wherein the alignment image has different pieces of characteristic information in at least two different regions;
an image sensor located at an edge of the foldable screen and configured to collect an alignment image in an opposed region of the image sensor after the foldable screen is folded; and
a driving display unit electrically connected to the image sensor and configured to, according to characteristic information of the alignment image in the opposed region of the image sensor, determine a position of the opposed region of the image sensor, and according to the position of the opposed region of the image sensor, determine a folded state of the foldable screen.

2. The foldable display device according to claim 1, wherein the characteristic information comprises at least one of display brightness or display chroma, and at least one of the display brightness or the display chroma of the alignment image are different in at least two different regions.

3. The foldable display device according to claim 2, wherein the foldable screen comprises a folding line, and the folding line is formed by folding the foldable screen; and in a first direction, at least one of the display chroma or the display brightness of at least two different regions in the alignment image are different, and the first direction is perpendicular to an extension direction of the folding line.

4. The foldable display device according to claim 3, wherein the foldable screen comprises a bending side, the bending side is bent during folding, and the bending side is perpendicular to the folding line.

5. The foldable display device according to claim 3, wherein the alignment image comprises a plurality of first partitions, the plurality of first partitions are sequentially arranged along the first direction, and display brightness of different first partitions of the plurality of first partitions is different, wherein
a first partition of the plurality of first partitions comprises a plurality of first sub-partitions, the plurality of first sub-partitions are sequentially arranged along the first direction; a plurality of first sub-partitions in a same first partition of the plurality of first partitions have same display brightness and different display chroma.

6. The foldable display device according to claim 3, wherein the alignment image comprises a plurality of second partitions, the plurality of second partitions are sequentially arranged along the first direction, display chroma of different second partitions of the plurality of second partitions is different, and display brightness of different positions in a same second partition of the plurality of second partitions in the first direction is different.

7. The foldable display device according to claim 2, wherein display chroma of at least two different regions of the alignment image in a second direction is different, and display brightness of at least two different regions of the alignment image in a third direction is different, wherein the second direction and the third direction are two directions intersecting on a plane where the foldable screen is located in a flat state,
wherein the alignment image comprises a plurality of third partitions arranged in an array along the second direction and the third direction, wherein
display chroma and display brightness of a same third partition of the plurality of third partitions are the same, a plurality of third partitions of the plurality of third partitions sequentially arranged in the second direction have different display chroma, and a plurality of third partitions of the plurality of third partitions sequentially arranged in the third direction have different display brightness.

8. The foldable display device according to claim 1, further comprising a storage unit, wherein a preset folded state lookup table is stored in the storage unit, and the folded state lookup table comprises a mapping relationship between characteristic information and a folded state; and the driving display unit is further configured to determine a folded state of the foldable screen in the folded state lookup table according to the characteristic information of the alignment image in the opposed region of the image sensor, wherein the characteristic information comprises at least one of display brightness or display chroma, and at least one of the display brightness or the display chroma of the alignment image are different in at least two different regions;

the folded state lookup table comprises a mapping relationship of display chroma, display brightness, and a folded state; and the driving display unit is further configured to determine a folded state of the foldable screen in the folded state lookup table according to at least one of the display chroma or the display brightness of the alignment image in the opposed region of the image sensor.

9. The foldable display device according to claim 1, wherein the first surface is a target display surface and the first surface is configured to display the alignment image, or the first surface is a target display surface and the second surface is configured to display the alignment image.

10. The foldable display device according to claim 1, wherein a plurality of image sensors are provided, the foldable screen comprises a plurality of corners and a plurality of sides, at least part of the plurality of image sensors are located at at least one corner of the plurality of corners and midpoint of at least one side of the plurality of sides.

11. The foldable display device according to claim 1, wherein the image sensor comprises an optical imaging system and a photosensitive chip, and the optical imaging system is located on a photosensitive side of the photosensitive chip.

12. The foldable display device according to claim 1, wherein the image sensor comprises a plurality of photoresistors, and the plurality of photoresistors comprise at least two types of photoresistors of different photosensitive colors.

13. The foldable display device according to claim 1, further comprising a folded angle detection unit, wherein the folded angle detection unit is electrically connected to the driving display unit;

the folded angle detection unit is configured to detect at least one of a folded action or a folded angle of the foldable screen; and before determining the position of the opposed region of the image sensor according to the characteristic information of the alignment image in the opposed region of the image sensor, the driving display unit is configured to perform at least one of: determining a folded action of the foldable screen; or correcting the position of the opposed region of the image sensor according to a folded angle of the foldable screen, wherein the folded angle detection unit comprises a strain resistor, and the strain resistor is disposed on at least one side of the foldable screen.

14. A driving method of a foldable display device, wherein the foldable display device comprises a foldable screen and an image sensor; the foldable screen comprises a first surface and a second surface which are disposed oppositely along a thickness direction of the foldable screen, the first surface or the second surface is a target display surface, and at least one of the first surface and the second surface displays an alignment image, wherein the alignment image has different pieces of characteristic information in at least two different regions; and the image sensor is located at an edge of the foldable screen; and the driving method comprises:

acquiring an alignment image in an opposed region of the image sensor after the foldable screen is folded;

determining a position of the opposed region of the image sensor according to characteristic information of the alignment image in the opposed region of the image sensor; and determining a folded state of the foldable screen according to the position of the opposed region of the image sensor.

15. The driving method according to claim 14, wherein the characteristic information comprises at least one of display brightness or display chroma, and at least one of the display brightness or the display chroma of the alignment image are different in at least two different regions; and determining the position of the opposed region of the image sensor according to the characteristic information of the alignment image in the opposed region of the image sensor comprises:

determining the position of the opposed region of the image sensor according to at least one of the display chroma or the display brightness of the alignment image in the opposed region of the image sensor.

16. The driving method according to claim 15, wherein the foldable display device further comprises a storage unit, a preset folded state lookup table is stored in the storage unit, and the folded state lookup table comprises a mapping relationship of display chroma, display brightness, and a folded state; and the position of the opposed region of the image sensor is determined according to characteristic information of the alignment image in the opposed region of the image sensor; and determining the folded state of the foldable screen according to the position of the opposed region of the image sensor comprises:

determining the folded state of the foldable screen in the folded state lookup table according to at least one of the display chroma or the display brightness of the alignment image in the opposed region of the image sensor, wherein before determining the folded state of the foldable screen in the folded state lookup table according to at least one of the display chroma or the display brightness of the alignment image in the opposed region of the image sensor, the method further comprises:

compensating at least one of the display chroma or the display brightness in a mapping relationship in the folded state lookup table according to use time of the foldable display device.

17. The driving method according to claim 14, before acquiring the alignment image in the opposed region of the image sensor after the foldable screen is folded, the method further comprises:

detecting a folded action of the foldable screen.

18. The driving method according to claim 14, wherein the foldable screen comprises a folding line, and the folding line is formed by folding the foldable screen; and in a first direction, characteristic information of at least two different regions in the alignment image is different, and the first direction is perpendicular to an extension direction of the folding line; and determining the folded state of the foldable screen according to the position of the opposed region of the image sensor comprises:

determining a distance L between the opposed region of the image sensor and a first edge of the foldable screen in the first direction, wherein the first edge is an edge whose extension direction is perpendicular to the first direction and whose position changes during folding; and determining a distance D between the folding line and the first edge of the foldable screen in the first direction based on a calculation formula $D=L/2$.

19. The driving method according to claim 14, wherein determining the folded state of the foldable screen according to the position of the opposed region of the image sensor comprises:

taking a plane where the foldable screen is in a flat state as a virtual two-dimensional plane, and determining two positions of a vertical projection of the image sensor on the virtual two-dimensional plane when the foldable screen is in the flat state and when the foldable screen is in the folded state, respectively; and taking a midperpendicular of a line between the two positions on the virtual two-dimensional plane as a folding line.

20. The driving method according to claim 14, wherein after determining the folded state of the foldable screen according to the position of the opposed region of the image sensor, the method further comprises:

determining a display region, wherein the display region is located in a region not shielded by a folded portion of the foldable screen; and driving the foldable screen to display in the display region.

\* \* \* \* \*